United States Patent [19]
Kim

[11] Patent Number: 5,645,508
[45] Date of Patent: Jul. 8, 1997

[54] FAIL-SAFE DEVICE FOR AUTOMATIC TRANSMISSION SYSTEM

[75] Inventor: Han-il Kim, Suwon, Rep. of Korea

[73] Assignee: Hyundai Motor Company, Seoul, Rep. of Korea

[21] Appl. No.: 490,692

[22] Filed: Jun. 16, 1995

[30] Foreign Application Priority Data

Jun. 22, 1994 [KR] Rep. of Korea ............... 94-14220

[51] Int. Cl.$^6$ ............................................. B60K 41/04
[52] U.S. Cl. ......................................... 74/336 R; 477/906
[58] Field of Search ........................... 477/906; 74/336 R, 74/335; 364/424.1

[56] References Cited

U.S. PATENT DOCUMENTS

| | | | |
|---|---|---|---|
| 4,039,061 | 8/1977 | Pruvot et al. | 364/424.1 X |
| 4,140,031 | 2/1979 | Sibeud et al. | 74/336 R X |
| 4,473,882 | 9/1984 | Suzuki et al. | 364/424.1 |
| 4,805,751 | 2/1989 | Ohkuno et al. | 477/906 X |
| 4,899,278 | 2/1990 | Yamamoto et al. | 477/906 X |
| 4,955,258 | 9/1990 | Ito et al. | 477/906 X |
| 5,021,955 | 6/1991 | Ito et al. | 477/906 X |
| 5,086,395 | 2/1992 | Kirstein | 477/906 X |
| 5,090,269 | 2/1992 | Ohtsuka et al. | 477/906 X |
| 5,243,527 | 9/1993 | Kröger | 364/424.1 X |
| 5,305,215 | 4/1994 | Brekkestran et al. | 364/424.1 |
| 5,404,301 | 4/1995 | Slicker | 364/424.1 |
| 5,461,563 | 10/1995 | Mimura | 74/336 R X |
| 5,486,147 | 1/1996 | Sakakiyama et al. | 477/906 X |

*Primary Examiner*—Charles A. Marmor
*Assistant Examiner*—Peter T. Kwon

[57] ABSTRACT

A fail-safe device for an automatic transmission system outputs a signal to control the transmission operation according to vehicle speed and engine rpm (revolution per minute) when normal transmission operation is not achieved because of a malfunction of input equipment or an automatic transmission controller. The device includes a vehicle driving sensor, a signal converter, a signal processor, and a signal-output member. The vehicle driving sensor outputs a corresponding signal by sensing both a vehicle speed and an engine rpm that are varied according to a vehicle driving state. The signal converter is connected with the vehicle driving sensor, and converts the signal from the vehicle driving sensor into the corresponding AC (alternating current) voltage by varying each pulse generating rate according to the vehicle speed and the engine rpm. The signal processor is connected with the signal converter, amplifies the AC voltage from the signal converter, compares the amplified AC voltage with the fixed reference voltage, combines a number of output signals, and outputs the driving signals of the first and second shift control solenoid valves. The signal-output member is connected with the signal processor, so as to vary the operating state through the reset signal from the automatic transmission controller, and controls the output signal from said signal processor.

14 Claims, 2 Drawing Sheets

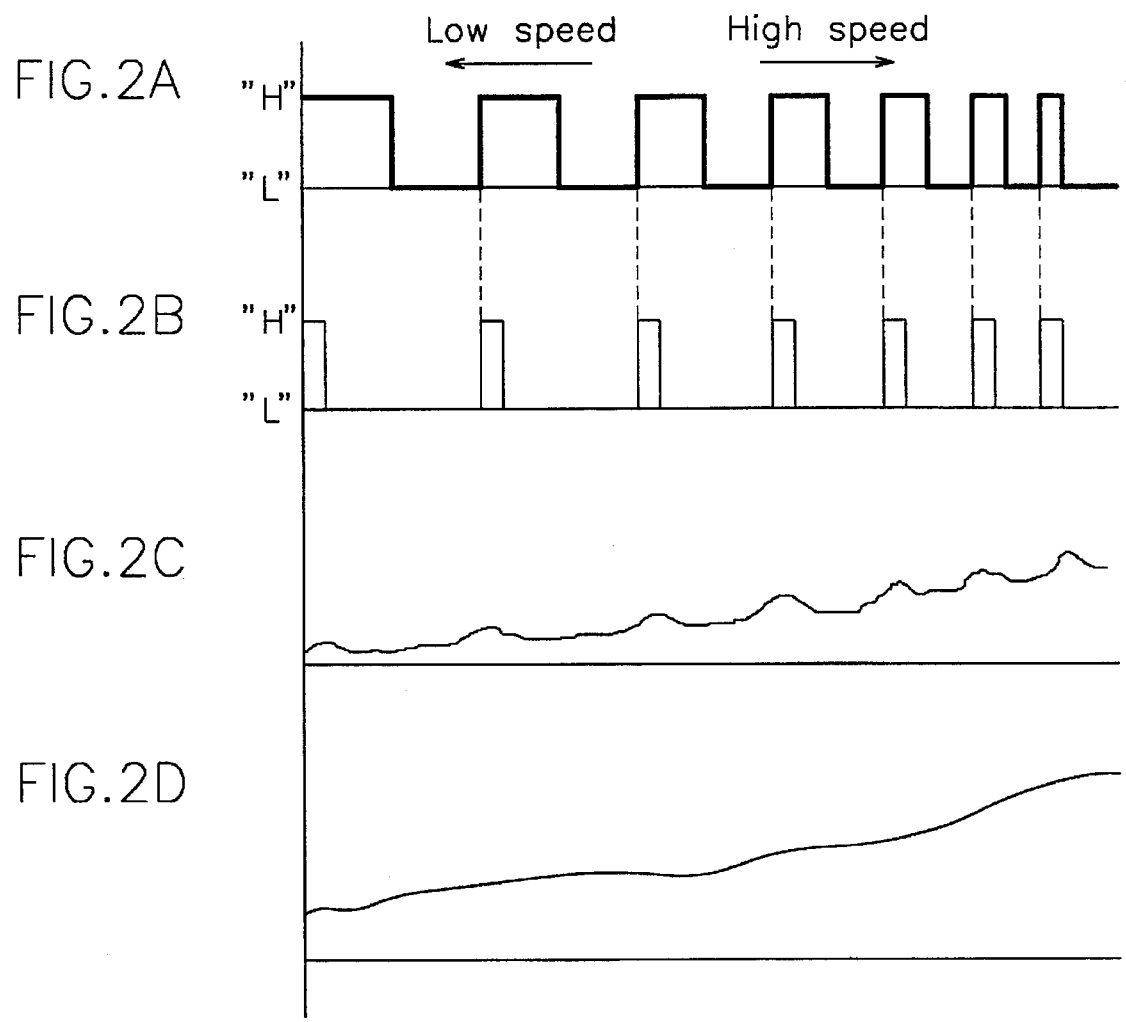

FAIL-SAFE DEVICE FOR AUTOMATIC TRANSMISSION SYSTEM

BACKGROUND OF THE INVENTION

(1) Field of Invention

The present invention relates to a fail-safe device for an automatic transmission system. More particularly, this invention relates to a fail safe device of an automatic transmission system which accomplishes a fixed transmission operation with a vehicle speed and an engine rpm (revolution per minute), when a normal gear shift is not achieved because of malfunction of a sensor equipment or an automatic transmission controller.

(2) Description of the Prior Art

In general, the automobile with automatic transmission automatically achieves a transmission operation through controlling a flow of fluid in the fixed transmission range with the vehicle speed.

To achieve the transmission operation, the transmission controller controls a torque of the fluid through operating a torque converter according to an output power of the engine, outputs a controlling signal for the gear shift according to an operating state of the automobile, and achieves the gear shift through operating the fluid by a valve.

The automobile having the automatic transmission is convenient for the driver because a foot-operated clutch is not required to shift gears and the automobile can be brought to a stop without using the clutch and without shifting the transmission into neutral.

Also, the automobile can easily do a hill climbing departure because of high driving power at a low speed, and is comfortable while driving because the engine torque's delivery is composed of the fluid.

As described above, the automatic transmission system automatically performs the gear shift according to the vehicle driving state. In case a normal gear shift is not achieved because of malfunction of a sensor equipment or an automatic transmission controller, the automatic transmission system provides itself with the fail safe means to prevent a gear shift which has no relation to the current driving state.

If there is a malfunction in the sensor equipment or the automatic transmission controller, the automatic transmission controller changes an output of each solenoid-valve into reset, and achieves a vehicle driving operation having the third speed.

However, by the fail safe function, in case the automatic transmission controller controls the driving operation through the fixed transmission stage which has no relation to the vehicle driving state of the automobile, the temperature of the working oil is abruptly increased because a slip occurs in the torque converter at the time the automobile is started.

The high temperature of the working oil deteriorates operation of oil pressure controlling system. As a result of the foregoing, there is a problem of difficulty in starting of the automobile.

SUMMARY OF THE INVENTION

An object of the present invention is to provide a vehicle with a fail safe device for an automatic transmission system to solve the above problems in the related art.

In case a normal gear shift is not achieved because of a malfunction of sensor equipment or an automatic transmission controller, this invention outputs a signal to control the gear shift by means of the vehicle speed and the engine rpm (revolution per minute). In order to achieve this object, this invention is composed of a vehicle driving sensing means, a signal-converting means, a signal-processing means, and a signal-output means. A description of each of the above elements will be illustrated hereinafter.

The vehicle driving sensing means outputs a corresponding signal by sensing both the vehicle speed and the engine rpm that are varied according to the vehicle driving state.

The signal-converting means, which is connected with the vehicle driving sensing means, converts a signal from the vehicle driving sensing means into an AC (alternating current) voltage by varying each pulse generating rate according to the vehicle speed and the engine rpm.

The signal-processing means, which is connected with the signal-converting means, amplifies the AC voltage from the signal-converting means, compares the amplified AC voltage with the banded reference voltage, combines a number of output signals, and outputs the driving signals of the first and second shift control solenoid valves.

The signal-output means which is connected with the signal-processing means, varies an operating state through a reset signal from the automatic transmission controller, and controls the output signal from the signal-processing means.

Other object and further scope of applicability of the present invention will become apparent from the detailed description given hereinafter. It should be understood, however, that the detailed description and specific examples, are given by way of illustration only, since various changes and modifications within the spirit and scope of this detailed description.

BRIEF DESCRIPTION OF THE DRAWINGS

The present invention will become more fully under stood from the detailed description given, hereinbelow and the accompanying drawing; which are given by way of illustration only, and thus, are not limitative of,-the present invention, and wherein:

FIG. 2A–2D are timing diagram of the fail-safe device for the automatic transmission system in accordance with a preferred embodiment of the invention.

DETAILED DESCRIPTION OF THE PREFERRED EMBODIMENTS

Figure 1:
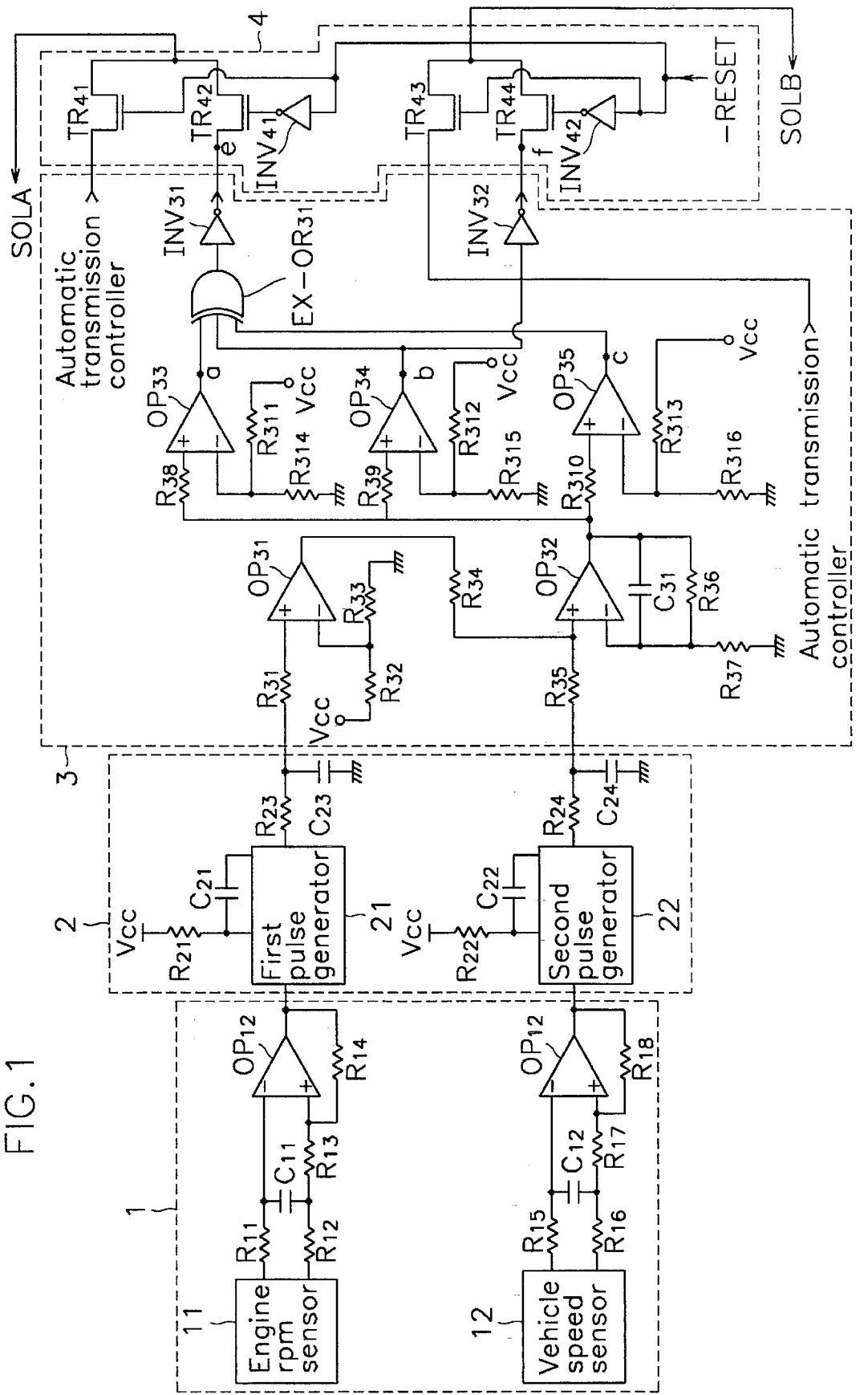
FIG. 1 is a detailed circuit diagram of the fail-safe device for the automatic transmission system in accordance with a preferred embodiment of the invention.

As shown in FIG. 1, the fail-safe device for the automatic transmission system is made of the following subsets in accordance with a preferred embodiment of the invention.

The fail safe device of the automatic transmission system is composed of the vehicle driving sensing unit 1 which outputs a signal by sensing both the vehicle speed and the engine rpm that are varied according to the vehicle driving state; a signal-converting unit 2 which generates a pulse signal by means of an output signal from the vehicle driving sensing unit 1; a signal-processing unit 3 which generates the controlling signals of the first and second shift control solenoid valves through both comparing the amplified output signal with the fixed reference voltage and amplifying an output signal from the signal-converting unit 2; and a signal-output unit 4 connected with said signal-processing unit 3. The signal-output means 4 varies an operating state through the reset signal -RESET from the automatic transmission controller (not shown in the drawings) and controls the signal output from the signal-processing unit 3.

The vehicle driving sensing unit 1 is composed of an engine rpm sensor 11, a vehicle speed sensor 12, resistors R11–R18, capacitors C11,C12, and operational amplifiers OP11,OP12. That is, the vehicle driving sensing unit 1 is composed of:

- the engine rpm sensor 11 which outputs an electrical signal which corresponds to a rotating speed of a crank shaft;
- the vehicle speed sensor 12 which outputs the signal which corresponds to a rotating speed of an output shaft;
- the resistors R11,R15, each of which have one side terminal connected with the engine rpm sensor 11 and the vehicle speed sensor 12;
- the capacitors C11,C12, each of which have one side terminal connected with the other side terminals of the resistors R11,R15, respectively;
- the resistors R12,R16, each of which have one side terminals connected with the other side terminal of the capacitors C11,C12, respectively, and of which other side terminal is connected with the engine rpm sensor 11 and the vehicle speed sensor 12, respectively;
- the resistors R13,R17, each of which have one side terminal connected with the one side terminal of the resistors R12,R16, respectively;
- the operational amplifiers OP11,OP12, each of which have an inverting terminal connected with the one side terminals of the capacitors C11,C12, respectively, and each of which have a non-inverting terminal connected with the other side terminal of the resistors R13,R17, respectively; and
- the resistors R14,R18, each of which have one side terminal connected with the non-inverting terminals of the operational amplifiers OP11,OP12, respectively, and each of which have the other side terminal are connected with the output terminals of the operational amplifiers OP11,OP12, respectively.

The signal-converting unit 2 is composed of the first and second pulse generators 21,22, resistors R21,R22,R23,R24, and capacitors C21,C22,C23,C24. That is, the signal-converting unit 2 is composed of:

- the first and second pulse generators 21,22 which output the corresponding pulse signals through the signals from the output terminals of the operational amplifiers OP11,OP12 of the vehicle driving sensing means 1;
- the resistors R21,R22, each of which have one side terminal are connected with a power supply Vcc, and each of which have the other side terminal connected with the first and second pulse generators 21,22, respectively;
- the capacitors C21,C22, each of which have one side terminal connected with the other side terminals of the resistors R21,R22, respectively, and each of which have other side terminal connected with the first and second pulse generators 21,22, respectively;
- the resistors R23,R24, each of which have one side terminal connected with the output terminal of the first and second pulse generators 21,22, respectively; and
- the capacitors C23,C24, each of which have one side terminal connected with the other side terminal of the resistors R23,R24, respectively, and each of which the other side terminal is grounded.

The signal-processing unit 3 is composed of resistors R31–R39, R310–R316, operational amplifiers OP31–OP35, an exclusive-OR gate EX-OR31, and inverters INV31,INV32. That is, the signal-processing unit 3 is composed of:

- the resistor R31 of which one side terminal is connected with the other side terminal of the resistor R23 of the signal-converting unit 2;
- the operational amplifier OP31 of which the non-inverting terminal is connected with the other side terminal of the resistor R31;
- the resistor R32 of which one side terminal is connected with the power supply Vcc, and of which other side terminal is connected with the inverting terminal of the operational amplifier OP31;
- the resistor R33 of which one side terminal is connected with the other side terminal of resistor R32, and of which the other side terminal is grounded.
- the resistor R34 of which one side terminal is connected with the output terminal of the operational amplifier OP31;
- the resistor R35 of which one side terminal is connected with the other side terminal of the resistor R24 of the signal-converting unit 2, and of which the other side terminal is connected with the other side terminal of the resistor R34;
- the operational amplifier OP32 of which the non-inverting terminal is connected with the other side terminal of the resistor R35;
- the capacitor C31 of which one side terminal is connected with the inverting terminal of the operational amplifier OP32, and of which the other side terminal is connected with the output terminal of the operational amplifier OP32;
- the resistor R36 of which one side terminal is connected with the inverting terminal of the operational amplifier OP32, and of which other side terminal is connected with the output terminal of the operational amplifier OP32;
- the resistor R37 of which one side terminal is connected with the inverting terminal of the operational amplifier OP32, and of which the other side terminal is grounded;
- the resistors R38–R39,R310, each of which have the other side terminals connected with the output terminal of the operational amplifier OP32.
- the operational amplifiers OP33–OP35, each of which have non-inverting terminals connected with the other side terminals of the resistors R38–R39,R310, respectively;
- the resistors R311–R313, each of which have one side terminal connected with the power supply Vcc, and of which other side terminals are connected with the inverting terminals of the operational amplifiers OP33–OP35, respectively;
- the resistors R314–R316, each of which have one side terminal connected with the other side terminal of the resistors R314–R316, and each of which have the other side terminal grounded, respectively;
- the exclusive-OR gate EX-OR31 of which the input terminal is connected with the output terminals of the operational amplifiers OP33–OP35;
- the inverter INV31 of which the input terminal is connected with the output terminal of the exclusive-OR gate EX-OR31; and
- the inverter INV32 of which the input terminal is connected with the output terminal of the operational amplifier OP34.

The signal-output unit 4 is composed of a first transistor TR41, a second transistor TR42, an inverter INV41, a third transistor TR43, a fourth transistor TR44, and an inverter INV42. That is, the signal-output unit 4 is composed of:

the first transistor TR41 of which the source terminal is connected with the automatic transmission controller, and of which the drain terminal is connected with the reset terminal -RESET of the automatic transmission controller;

the second transistor TR42 of which the source terminal is connected with the output terminal of the inverter INV31 of the signal-processing unit 3, and of which drain terminal is connected with the drain terminal of the first transistor TR41 that is connected with a first gear shift control solenoid valve SOLA;

the inverter INV41 of which the input terminal is connected with the reset terminal -RESET of the automatic transmission controller, and of which the output terminal is connected with the gate terminal of the second transistor TR42;

the third transistor TR43 of which the source terminal is connected with the automatic transmission controller, and of which the gate terminal is connected with the reset terminal -RESET of the automatic transmission controller;

the fourth transistor TR44 of which the source terminal is connected with the output terminal of the inverter INV32 of the signal-processing unit 3, and of which the drain terminal is connected with the drain terminal of the third transistor TR43 that is connected with the second gear shift control solenoid valve SOLB; and the inverter INV42 of which the input terminal is connected with the reset terminal -RESET of the automatic transmission controller, and of which the output terminal is connected with the gate terminal of the fourth transistor TR44.

According to the preferred embodiment of this invention having said composition, operation of the fail-safe device of the automatic transmission system is described below.

If a user turns on the power supply, the fail-safe device of the automatic transmission system in accordance with the preferred embodiment of this invention is operated. If the fail-safe device operates, the fail-safe device estimates the vehicle driving state by a pulse signal from the vehicle driving sensing unit 1. The pulse signal corresponds to the rotating speed of both the crank shaft and the output shaft that rotate together with the engine.

A more detailed description of the above is as follows:

As the crank shaft or the output shaft rotates, an electromotive force is induced through both the vehicle speed sensor 12 and the engine rpm sensor 11o The vehicle speed sensor 12 and the engine rpm sensor 11 output a sine wave signal which varies a period in accordance with the engine rpm or the vehicle speed. The sine wave signal from the vehicle speed sensor 12 and the engine rpm sensor 11 passes through the resistors R11,R12,R15,R16, and converts into a rectangular wave signal by the charge/discharge of the capacitors C11,C12. The feedback output signal through the resistors R13,R14,R17,R18 outputs the pulse signal through the operational amplifiers OP11,OP12 which are operated as comparators. That is, the pulse signal has the same period as the output signal from the vehicle speed sensor 12 and the engine rpm sensor 11, and varies the period according to the rotating speed of the crank shaft or the output shaft as shown in FIG. 2A.

As described above, if the pulse signal which corresponds to both the engine rpm and the rotating speed of the output shaft is applied to the signal-converting unit 2, the signal-converting means 2 outputs the pulse signal which is varied with the signal state from the vehicle driving sensing unit 1.

The first and second pulse generators 21,22 of the signal-converting unit 2 are composed of a multivibrator which varies the signal form according to an applied signal for the input terminal and binds the pulse period according to the resistors R21,R22 and a time constant of the capacitors C21,C22.

Consequently, as shown in FIG. 2B, the signal-converting unit 2 outputs the pulse signal when either the engine rpm sensing signal or the vehicle speed sensing signal from the vehicle driving sensing unit 1 converts a low level "L" signal to a high level "H" signal, maintains the high level signal as the determined time constant by the resistors R21,R22 and capacitors C21,C22, and converts it to the low level signal.

After that, the signal-converting unit 2 changes the engine rpm sensing signal and the vehicle speed sensing signal into a signal whose function is to vary the pulse generating time with the rotating speed, and outputs the signal which is facilitated by the resistors R23,R24 and the charge/discharge of the capacitors C23,C24 as shown in FIG. 2C. At this time, the charge/discharge time is determined through both the resistors R23,R24 and the time constant of the capacitors C23,C24.

As described above, by the signal-converting unit 2, the pulse signal of the vehicle driving sensing means 1 varies the pulse generating ratio according to the engine rpm and the rotating speed of output shaft, once more varies its output voltage state according to the pulse generating ratio, and then is applied to the signal-processing unit 3.

If a signal which corresponds to the pulse generating ratio with the output signal of the engine rpm sensor 11 is applied to the non-inverting terminal of the operational amplifier OP31 which is operated as the comparator through the resistor R31 of the signal-processing unit 3, the operational amplifier OP31 compares the signal with the reference voltage which is applied to the inverting terminal of the resistors R32,R33 through binding its value by the resistors R32,R33.

For the above operational amplifier OP31, if one reference voltage which is applied to its non-inverting terminal is larger than the other reference voltage which is applied to its inverting terminal, it outputs the high level signal "H"; if one reference voltage which is applied to its non-inverting terminal is smaller than the other reference voltage which is applied to its inverting terminal, it outputs the low level signal "L".

Also, the operational amplifier OP32 inputs the signal which corresponds to the rotating speed of the output shaft through both the resistor R24 and the capacitor C24 of the signal-converting unit 2.

According to both the voltage which is applied to the non-inverting terminal through the resistor R35 and the feedback output voltage for the inverting terminal from the resistors R36,R37, the operational amplifier OP32 amplifies the input signal and removes noise through the capacitor C31, and then the signal is applied to the one side terminals of each operational amplifiers OP33–OP35 that are operated by the comparator through outputting a signal shown in FIG. 2D.

Each reference voltage through the resistors R311–R316, whose function is to divide the voltage, compares itself with the output voltage of the operational amplifiers OP32 through the resistors R38–R39,R310. Each output terminal of the operational amplifiers OP33–OP35 applies to either the high level signal "H" or the low level signal "L".

In this case, the signal-processing unit 3 binds each fixed reference voltages by the resistors R311-R316. Each fixed reference voltage is different from another reference voltage.

As shown in table 1, the signal-processing unit 3 can successively vary the output state of operational amplifiers OP33-OP35 according to the vehicle speed.

TABLE 1

| Vehicle Speed | a | b | c | SOL A or e | SOL B or f |
|---|---|---|---|---|---|
| First Speed | L | L | L | H | H |
| Second Speed | H | L | L | L | H |
| Third Speed | H | H | L | L | L |
| Fourth Speed | H | H | H | H | L |

After all, according to the output signal of the vehicle speed sensor 12 of the vehicle driving sensing unit 1 which varies the output signal with the vehicle speed, the output signals of the operational amplifiers OP33-OP35 are operated. Thus, controlling operation for the fixed transmission stage can be facilitated in accordance with the vehicle speed.

However, in case the voltage through the resistor R31 is larger than the reference voltage through resistors R32,R33 because the engine rpm increases beyond the fixed speed, namely, in case the operational amplifier OP31 outputs the high level signal, the output signal of the operational amplifier OP31 of the signal-processing unit 3 is applied to the non-inverting terminal of the operational amplifier OP32 through the resistor R34. Consequently, the signal-processing unit 3 raises the output level of the operational amplifier OP32 to the fixed level.

Accordingly, to raise the output of the operational amplifiers OP33-OP35 as much as the first speed when the vehicle speed is determined, the signal-processing means 3 raises the output voltage of the operational amplifier OP32 which is fixed by the output signal of the vehicle speed of the vehicle driving sensing means 1.

As a result of that, if the engine rpm is beyond the fixed engine rpm, the signal-processing means 3 outputs the controlling signal to control operation of the automatic transmission system by means of a gear ratio which is one level higher than the fixed gear ratio determined by the vehicle speed 12.

As described above, if the output signal which corresponds to both the engine rpm and the vehicle speed is output through the output terminals of the operational amplifiers OP33-OP35, according to output signals of the operational amplifiers OP33-OP35 as shown in Table 1, each corresponding signal is output by the operation of both the exclusive-OR gate and the inverters INV31,INV32.

If output signals of inverters INV31,INV32 are determined by both the engine rpm and the vehicle speed, according to the operating state of the automatic transmission controller whose function is to control the operation of the automatic transmission system, the signal-output means 4 controls the operation of the first and second shift control solenoid valves(not shown in the drawings).

Namely, if both the input signal and the operating state of the automatic transmission controller are in the normal state, the reset signal -RESET from the automatic transmission controller reaches a higher level "H".

If low level signals "L" are applied to gate terminals of the second transistor and fourth transistors TR42,TR44 through the inverters INV41,INV42, the second transistor and fourth transistors TR42,TR44 maintain a turn-off state, while the gate terminals of the first and third transistors TR41,TR43 apply the high level signal, thus the first and third transistors TR41,TR43 are turned on.

Consequently, controlling signals SOLA, SOLB of the first and second shift control solenoid valves, which are applied by the automatic transmission controller through the first and third transistors TR41,TR43 that are turned on, control the operation of the automatic transmission system.

However, if both the input signal and the operating state of the automatic transmission controller are in the malfunction state, because the reset signal -RESET from the automatic transmission controller is shifted to the low level signal "L", the first and third transistors TR41,TR43 convert the turn-on state to the turn-off state, and the second and fourth transistors TR42,TR44 convert the turn-off state to the turn-on state.

In this case, the controlling signals from inverters INV31, INV32 of the signal-processing means 3 pass through the second and fourth transistors TR42,TR44, are applied to the controlling signals SOLA, SOLB of the first and second shift control solenoid valves, and control the operation of the automatic transmission system.

Accordingly, as described above, the fail safe device can vary the transmission state in accordance with the engine rpm and the vehicle speed even if both the input signal and the operating state of the automatic transmission controller are in the malfunction state. Therefore, the automobile can maintain the stable driving operation.

Also, the fail-safe device can avoid unreasonable operation of the automatic transmission system because an automobile operates at various speeds, not at a fixed speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fail-safe device for an automatic transmission system of a vehicle, comprising:

vehicle driving sensing means for outputting a corresponding signal by sensing both a vehicle speed and an engine rpm which are each varied according to a vehicle driving state;

signal-converting means, connected with said vehicle driving sensing means, for converting a signal from said vehicle driving sensing means into AC (alternating current) voltage by varying each pulse generating rate according to the vehicle speed and the engine rpm;

signal-processing means, connected with said signal-converting means, for amplifying the AC voltage from said signal-converting means, comparing the amplified AC voltage with a first fixed reference voltage, and outputting driving signals of first and second shift control solenoid valves based on a result of said comparison; and signal-output means, connected with said signal-processing means, for varying an operating state of said automatic transmission based on a reset signal from an automatic transmission controller, and controlling output of said driving signals from said signal-processing means.

2. The fail-safe device for the automatic transmission system as defined in claim 1, wherein said vehicle driving sensing means comprises:

an engine rpm sensor which outputs an electrical signal corresponding to a rotating speed of an engine crank shaft;

a vehicle speed sensor which outputs a signal corresponding to a rotating speed of an output shaft of said automatic transmission; and operational amplifiers which receive signals from said engine rpm sensor and said vehicle speed sensor through capacitors, and compare said received signals with output signals therefrom as supplied by a plurality of resistors.

3. The fail-safe device for the automatic transmission system as defined in claim 1, wherein said signal-converting means comprises:

first and second pulse generators which vary a signal state in accordance with output signals of said vehicle driving sensing means, each of said first and second pulse generators having a resistor and capacitor connected in series thereto, and said first and second pulse generators determining a pulse period in accordance with said resistors and capacitors connected thereto; and a plurality of noise filtering means, connected with said pulse generators, for removing noise from output of said first and second pulse generators.

4. The fail-safe device for the automatic transmission system as defined in claim 1, wherein said signal-processing means comprises:

first comparing means for comparing an output signal of said signal-converting means with the first fixed reference voltage;

signal amplifying means for amplifying the output signal of said signal-converting means;

second comparing means for comparing an output signal of said signal amplifying means with at least a second and third fixed reference voltage, and outputting a corresponding signal; and signal combination means for first operating on a plurality of output signals of said second comparing means using a logic gate, second operating on one of said plurality of output signals from said second comparing means using another logic gate, and generating said driving signals for the first and second shift control solenoid valves based on said first and second operation.

5. The fail-safe device for the automatic transmission system as defined in claim 4, wherein said first comparing means comprises:

an operational amplifier of which one side terminal receives said output signal of said signal-converting means, and of which another side terminal receives said first fixed reference voltage.

6. The fail-safe device for the automatic transmission system as defined in claim 4, wherein said signal amplifying means comprises:

an operational amplifier of which one side terminal receives both said output signal of said first comparing means and said output signal of said signal-converting means, and of which another side terminal receives an output signal of said operational amplifier via resistors; and a capacitor having a first end connected with an output terminal of said operational amplifier and a second end connected to said another side terminal of said operational amplifier.

7. The fail-safe device for the automatic transmission system as defined in claim 4, wherein said second comparing means comprises:

at least first and second operational amplifiers, each of which has one side terminal receiving output from said signal amplifying means, and each of which has another side terminal for receiving said second and third fixed reference voltages, respectively.

8. The fail-safe device for the automatic transmission system as defined in claim 4, wherein said signal combination means comprises:

an exclusive-OR gate which logically operates on said plurality of output signals from said second comparing means;

an inverter which inverts an output signal of said exclusive-OR gate; and an inverter which inverts one of said plurality of output signals from said second comparing means.

9. The fail-safe device for the automatic transmission system as defined in claim 1, wherein said signal-output means comprises:

a plurality of switching means for selectively transmitting a signal from the automatic transmission controller and said driving signals in accordance with a reset signal from said automatic transmission controller.

10. A fail-safe device for an automatic transmission system of a vehicle, comprising:

an automatic transmission controller;

sensing means for sensing a vehicle driving state;

generating means for generating driving signals for shift solenoids of said automatic transmission based on output from said sensing means; and selecting means for outputting control signals to said shift solenoids, and for selectively outputting one of signals from said automatic transmission controller and said driving signals as said control signals based on a reset signal produced by said automatic transmission controller, said reset signal indicating whether a malfunction has occurred in an automatic transmission control system for said automatic transmission.

11. A fail-safe device for the automatic transmission system as defined in claim 10, wherein said automatic transmission control system includes sensor equipment supplying inputs to said automatic transmission controller.

12. A fail-safe device for the automatic transmission system as defined in claim 10, wherein said sensing means senses both a vehicle speed and a speed of an engine in said vehicle.

13. A fail-safe device for the automatic transmission system as defined in claim 10, further comprising:

signal converting means for converting output of said sensing means into a voltage indicative of said vehicle driving state; and wherein said generating means generates said driving signals for said first and second shift solenoids based on output from said signal converting means.

14. A fail-safe device for the automatic transmission system as defined in claim 10, wherein said generating means comprises:

comparing means for comparing signals indicative of said vehicle driving state with at least a first and second reference signal; and generating said driving signals based on results of said comparison.

* * * * *